United States Patent
Takeda et al.

[11] Patent Number: 5,992,021
[45] Date of Patent: Nov. 30, 1999

[54] DOOR FRAME AND METHOD FOR FORMING A DOOR FRAME

[75] Inventors: Shinya Takeda, Toyota; Hirotake Nakao, Chiryu; Katsuzi Sakuma, Nagoya; Masaru Hoshina; Atuo Torii, both of Kariya; Aiichiro Yokota, Anjo; Koujirou Kubota, Toyota, all of Japan

[73] Assignee: Aisin Seiki Kabushiki Kaisha, Japan

[21] Appl. No.: 08/799,409

[22] Filed: Feb. 12, 1997

[30] Foreign Application Priority Data

Feb. 13, 1996 [JP] Japan ................................ 8-025439

[51] Int. Cl.$^6$ ........................... B60J 5/04; E05D 15/16
[52] U.S. Cl. .................. 29/897.2; 49/502; 29/897.312; 296/146.9
[58] Field of Search ........................ 29/897.2, 897.312; 49/502; 296/146.3, 146.9

[56] References Cited

U.S. PATENT DOCUMENTS

| | | | |
|---|---|---|---|
| 1,709,185 | 4/1929 | Murray, Jr. | 29/463 |
| 4,457,111 | 7/1984 | Koike | 296/146.3 X |
| 5,107,624 | 4/1992 | Passon | 49/502 |
| 5,495,693 | 3/1996 | Tiesler | 49/502 |

FOREIGN PATENT DOCUMENTS

| | | |
|---|---|---|
| 0 040 588 | 11/1981 | European Pat. Off. . |
| 0 061 027 | 9/1982 | European Pat. Off. . |
| 0 163 208 | 12/1985 | European Pat. Off. . |
| 0 217 764 | 4/1987 | European Pat. Off. . |
| 6-32139 | 4/1994 | Japan . |

OTHER PUBLICATIONS

Search Report of the British Patent Office dated Mar. 19, 1997 (2 pages).

*Primary Examiner*—Joseph M. Gorski
*Attorney, Agent, or Firm*—Finnegan, Henderson, Farabow, Garrett & Dunner, L.L.P.

[57] ABSTRACT

A door frame for a vehicle includes a main member formed by one sheet and having a first supporting portion with an opening, a second supporting portion which has an opening oppositely arranged to the opening of the first supporting portion, a decorative portion which has a sloped edge portion that changes the width of the decorative portion, and a submember formed by one sheet and fixed to the main member so as to form an enclosed space between the main member and the submember. The cross-sectional area of the enclosed space gradually changes along the longitudinal direction of the door frame.

5 Claims, 4 Drawing Sheets

DOOR FRAME AND METHOD FOR FORMING A DOOR FRAME

BACKGROUND OF THE INVENTION

1. Field of the Invention

The present invention generally relates to a door frame for a vehicle and a method for forming the door frame.

2. Description of the Related Art

A door frame and a method for forming the door frame is disclosed in Japanese Utility Model laid-open publication No. 6(1994)-32139.

In this publication, a one-piece sheet is formed into a door frame which includes a first supporting portion, a second supporting portion, a decorative portion and an enclosed space.

The first supporting portion has an opening and supports a weather strip which seals the opening between the door frame and a window glass. The second supporting portion has an opening which is oppositely arranged to the opening of the first supporting portion and supports a weather strip which seals the opening between the door frame and a vehicle body. The decorative portion has a gradually changing edge portion in one side edge thereof formed along a longitudinal direction so as to change the width of the decorative portion, and is arranged parallel to the direction of the openings of the first and second supporting portions. The enclosed space is oppositely arranged to the decorative portion through the first support portion and the second support portion. The cross-sectional area of the enclosed space is constant along a longitudinal direction of the door frame.

However, as so designed, the rigidity of the door frame is constant at any portion in the longitudinal direction of the door frame. Therefore, the door frame is heavy.

The method for forming this door frame includes a roll-forming step, a cutting step and a hemming step.

In the roll-forming step, the sheet is bent to form the first supporting portion, the second supporting portion, the decorative portion and the enclosed space. In the cutting step, one slat of a piled portion of the sheet at one side edge of the decorative portion is cut into a shape which gradually changes its slope. In the hemming step, the other slat of the piled portion of the sheet is hemmed along the cut line of the one slat. The cutting step and the hemming step form the gradually changed edge portion on the one side edge of the decorative portion. However, the process of forming the door frame is complicated by the cutting and hemming steps.

SUMMARY OF THE INVENTION

A need exists, therefore, for a door frame and a method for forming the door frame which addresses at least the foregoing drawbacks of the prior art.

To achieve the objects and in accordance with the purpose of the invention, as embodied and broadly described herein, the door frame of the present invention comprises a main member formed by one sheet and including a first supporting portion which has an opening, a second supporting portion which has an opening oppositely arranged to the opening of the first supporting portion, and a decorative portion which has a sloped edge portion which causes a gradual change in the width of the decorative portion, and a submember formed by one sheet and fixed to the main member so as to form an enclosed space between the main member and the submember, the cross-sectional area of the enclosed space gradually changing along a longitudinal direction of the door frame.

Further in accordance with the present invention, there is provided a method for forming a door frame including a first supporting portion, a second supporting portion, a decorative portion and an enclosed space, wherein the method comprises bending a first sheet to form a main member including the first supporting portion, the second supporting portion and the decorative portion, while simultaneously forming a side edge of the decorative portion, the width of which gradually changes, bending a second sheet to form a submember simultaneously with bending the first sheet, inserting the submember into the main member so as to form the enclosed space which gradually changes in cross-sectional area, and attaching the main member and the submember free of any joint in the decorative portion.

BRIEF DESCRIPTION OF THE DRAWINGS

The foregoing and additional features of the present invention will become more apparent from the following detailed description of a preferred embodiment thereof when considered with reference to the attached drawings, in which.

DETAILED DESCRIPTION OF THE PREFERRED EMBODIMENT

Hereinafter a door frame and a method of forming the door frame according to an embodiment of the present invention is explained with reference to FIG. 1, FIG. 2, FIG. 3 and FIG. 4.

Figure 1:
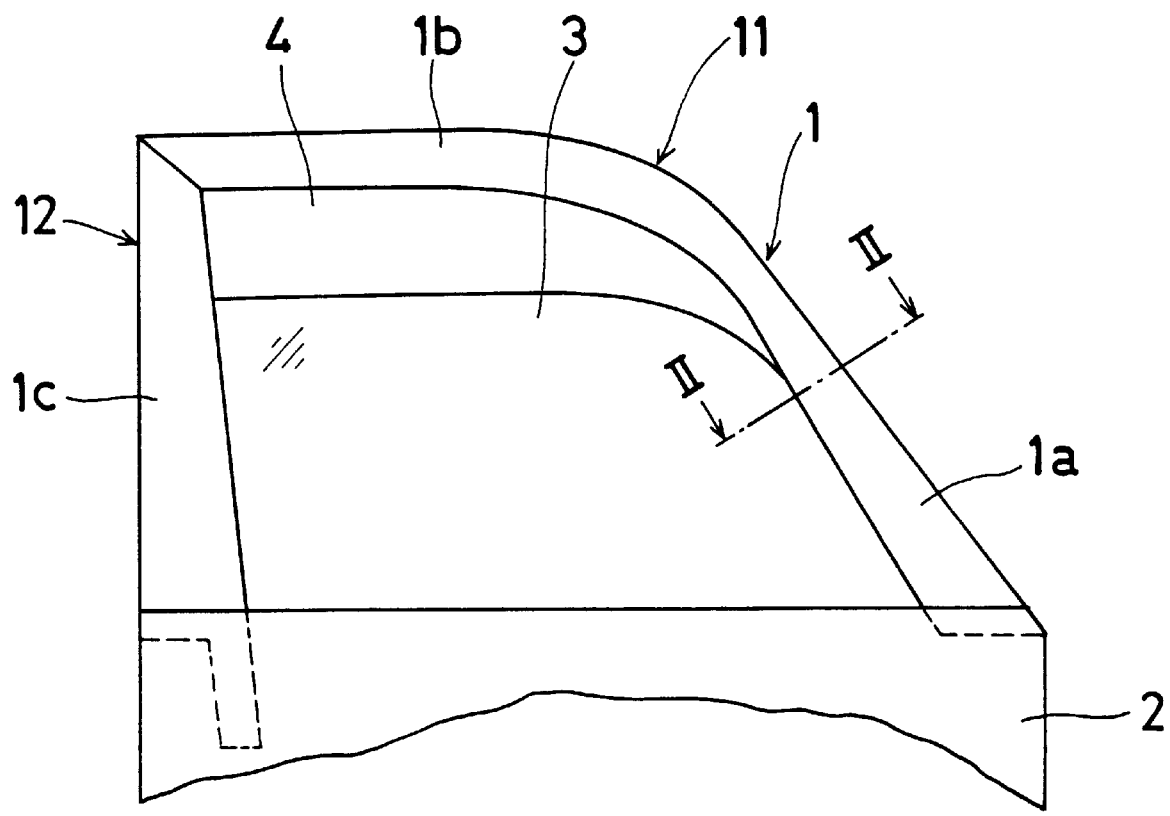
FIG. 1 is a front view of a door frame according to the present invention.
Figure 2:
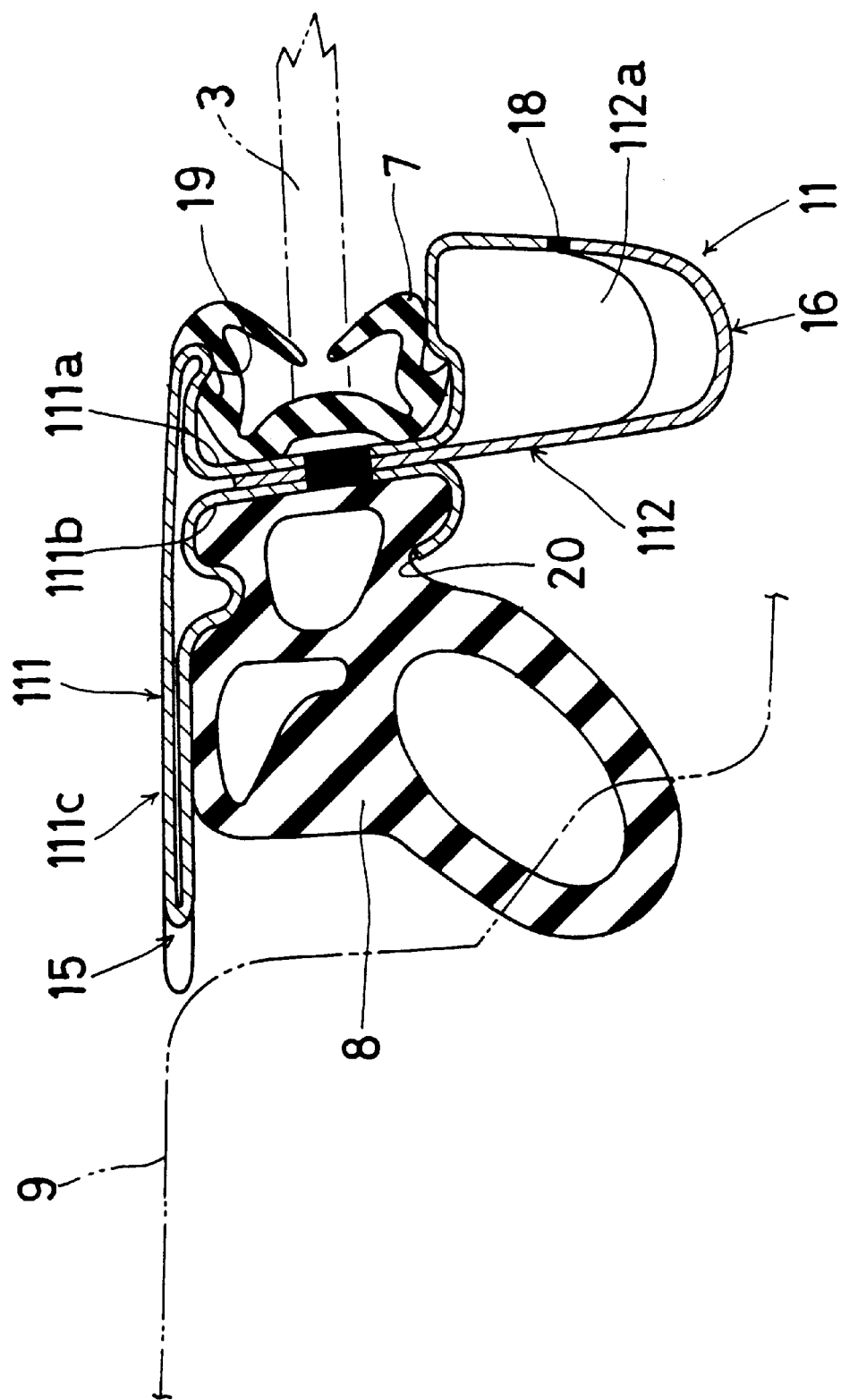
FIG. 2 is a cross-sectional view taken along line II—II in FIG. 1.

As shown in FIG. 1 and FIG. 2, a metal door frame 1 of a vehicle defines a window opening 4 which is designed to be opened and closed by a window glass 3 in a door panel 2 of the vehicle. The window glass 3 moves up and down to open and close the window opening 4.

The door frame 1 of the vehicle comprises a frame member 11 and a pillar member 12. The frame member 11 is connected to a door panel 2 at one end thereof and includes a front portion 1a and a top portion 1b arranged around the window opening 4. The pillar member 12 is connected to the door panel 2 at one end thereof and is positioned at 1c to a rear portion of the window opening 4. The frame member 11 is welded to the pillar member 12 between the other end of the frame member 11 and other end of the pillar member 12.

Figure 3:
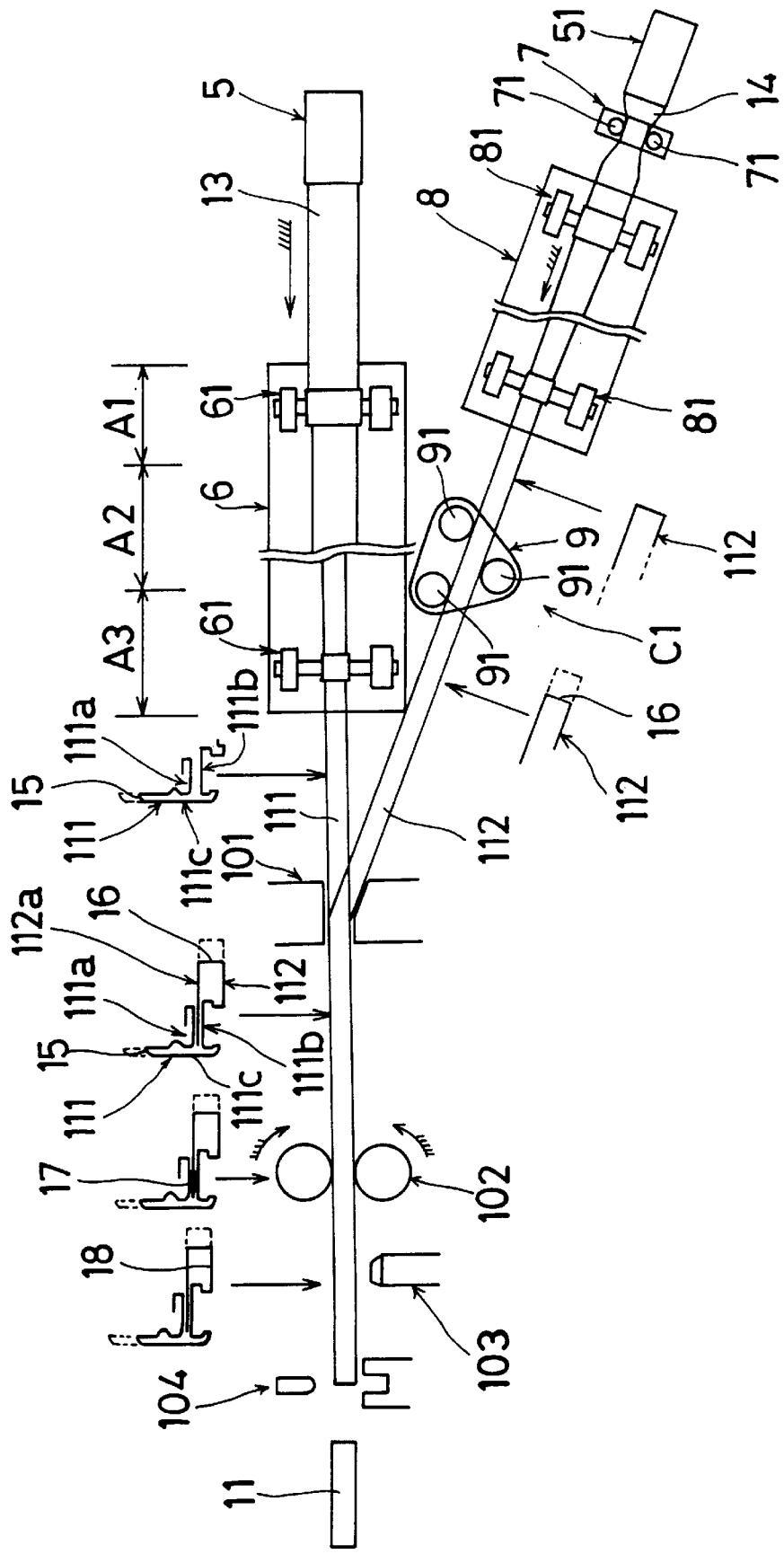
FIG. 3 is a schematic view of a manufacturing line according to the present invention.

The frame member 11 of the door frame 1 is formed in two pieces comprising main member 111 formed by the first sheet 13 (shown in FIG. 3) and submember 112 formed by the second sheet 14 (shown in FIG. 3). The main member 111 of the frame member 11 comprises a first supporting portion 111a, a second supporting portion 111b and a decorative portion 111c. The first supporting portion 111a is formed into a U-shaped cross-section and has an opening 19. The first supporting portion 111a supports a weather strip 7 which seals the opening 19 between the door frame 1 and the window glass 3. The second supporting portion 111b is formed into a U-shaped cross-section and has an opening 20 which is arranged oppositely to the opening 19 of the first supporting portion 111a. The second supporting portion 111b supports a weather strip 8 which seals the opening 20 between the door frame 1 and a body 9 of the vehicle.

The decorative portion 111c is arranged parallel to a direction of the openings 19,20 of the first and second supporting portion 111a, 111b. A first side edge portion of the decorative portion 111c, on the side of the second supporting portion 111b, is continuously connected to the second supporting portion 111b. A second side edge portion of the decorative portion 111c, on the side of the first supporting portion 111a, is continuously connected to the first supporting portion 111a. The first side edge portion of the decorative portion 111c has a sloped edge portion 15 that gradually changes along a longitudinal vertical direction of the frame member 11. The sloped edge portion 15 changes the width of the decorative portion 111c. The width of the decorative portion 111c gradually widens from the top portion 1b to the front portion 1a by the sloped edge portion 15.

The submember 112 of the frame member 11 is formed in a U-shaped cross-section and attached to the main member 111. One end of the submember 112 is positioned between the first supporting portion 111a and the second supporting portion 111b and other end of the submember 112 is continuously connected to an end of first supporting portion 111a. Therefore, the main member 111 and submember 112 form an enclosed space 112a therebetween. A bottom of the enclosed space 112a has a sloped wall 16 that gradually changes along a longitudinal direction of the frame member 11. The sloped wall 16 changes the cross-sectional area of the enclosed space 112a.

The pillar member 12 of the door frame 1 is formed in two pieces (not shown) by sheets and comprises a first supporting portion, a second supporting portion, a decorative portion and an enclosed space, the same as described above in the case of the main member 11.

Figure 4:
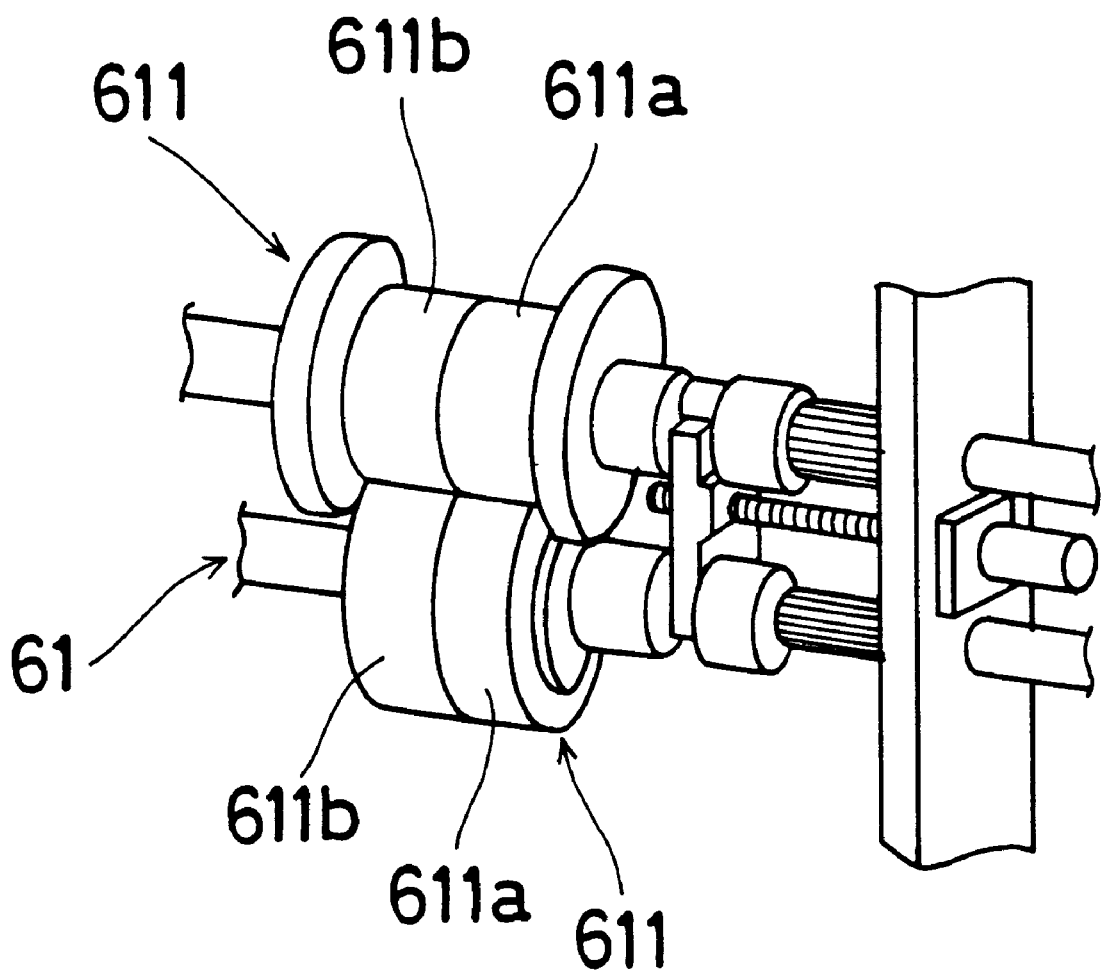
FIG. 4 is a perspective view of a roller of a roll-forming machine shown in FIG. 3.

As shown in FIG. 3, the sheet 13 is supported on a supporting stand 5 by winding the sheet 13 around a shaft (not shown) of the supporting stand 5. A roll-forming machine 6 is arranged downstream of the supporting stand 5. The roll-forming machine 6 comprises plural roller stands 61. The roller stands 61 are arranged in sequence along the roll-forming machine 6. As shown in FIG. 4, each roller stand 61 has a pair of rollers 611 which are oppositely arranged as upper and lower rollers having a clearance and which are rotatably supported on the roller stand. The rotational speed of the rollers 611 of the roller stands 61 gradually increases in sequence beginning with the roller stand furthest upstream in the roll-forming machine 6. Each roller 611 comprises a moving piece 611a and a fixed piece 611b. Each moving piece 611a moves relative to each fixed piece 611b along the axial direction of the roller 611. Movement of the moving piece 611a interlocks movement of the moving piece 611b.

The sheet 14 is supported on a supporting stand 51 by winding the sheet 14 around a shaft (not shown) of the supporting stand 51. A trimming machine 7 is arranged downstream of the supporting stand 51. The trimming machine 7 has pair of cutters 71 for cutting side edges of the sheet 14 to a given shape. A roll-forming machine 8 is arranged downstream of the trimming machine 7. The roll-forming machine 8 comprises plural roller stands 81. The roller stands 81 are arranged in sequence along the roll-forming machine 8. Each roller of roller stand 81 has a fixed piece (not shown) which does not move along the axial direction of the roller. A bending machine 9 is positioned downstream of the roll-forming machine 8. The bending machine 9 comprises three spaced rollers 91, each of which is rotatable and positioned to provide therebetween a preset space. After the sheet 14 is roll-formed by the roll-forming machine 8, the sheet 14 passes through the preset space by the positioning of the three rollers 91.

A guiding machine 101 is positioned downstream of both the roll-forming machine 6 and the bending machine 9. The guiding machine 101 guides together the sheet 13 (the main member 111) which is roll-formed by the roll-forming machine 6 and the sheet 14 (the submember 112) which is bent by the bending machine 9. The submember 112 is inserted into the main member 111 by the guiding machine 101.

A spot welding machine 102 is arranged downstream of the guiding machine 101, and a laser welding machine 103 is arranged downstream of the spot welding machine 102. The spot welding machine 102 and the laser welding machine 103 weld together the main member 111 and the submember 112.

A cutting machine 104 is arranged downstream of the laser welding machine 103. The cutting machine 104 cuts the main member 111 and the submember 112 which are welded together to a given length.

As shown in FIG. 3, the sheet 13 passes through the roll-forming machine 6 from the supporting stand 5, and the main member 111 is formed. When the sheet 13 is shaped at a section A1 of the roll-forming machine 6, the sheet 13 is bent by the shape of each roller 611 of the section A1. Therefore, the first supporting portion 111a is formed. When the sheet 13 is shaped at section A2 of the roll-forming machine 6, the sheet 13 is bent by the shape of each roller 611 of the section A2. Therefore, the second portion 111b is formed. When the sheet 13 is shaped at section A3 of the roll-forming machine 6, the sheet 13 is bent by the shape of each roller 611 of the section A3. Therefore, the decorative portion 111c is formed. When one side edge portion of the decorative portion 111c is formed, its width is gradually changed by the shape of each roller 611 of the section A3 at the same time. Therefore, the sloped edge portion 15 of the decorative portion 111c is formed. Further, when the sheet 13 is shaped by the rollers 611 of the section A1 to A3, each moving piece 611a is moved relative to the fixed piece 611b along the edge of the sheet 13.

When the main member 111 is being formed, the sheet 14 passes the trimming machine 7, the roll-forming machine 8 and bending machine 9 from the supporting stand 51 simultaneously. Therefore, the submember 112 is formed. When the sheet 14 is shaped at the trimming machine 7, the edges of sheet 14 are cut into a given shape by the cutters 71. When the sheet 14 is shaped at the roll-forming machine 8, the sheet 14 is bent by the shape of each roller of the roll-forming machine 8. Therefore, the sheet 14 is formed into the U-shape. When the sheet 14 is shaped at the bending machine 9, the U-shaped sheet 14 is bent so that the edges of the sheet 14 which have been formed in the given shape by the trimming machine 7 become flat along the longitudinal direction of the submember 112. The gradually sloped wall 16 of the submember 112 is thus formed.

After the main member 111 is formed by passing through the roll-forming machine 6 and the submember 112 is formed by passing through the bending machine 9, the main member 111 and submember 112 are guided together by the guiding machine 101. The submember 112 is inserted into the main member 111 so that one end of the submember 112 is placed between the first supporting portion 111a and the second supporting portion 111b of the main member 111, and other end of the submember 112 is placed against the edge of the first supporting portion 111a of the main member 111.

After the submember 112 is inserted into the main member 111 by the guiding machine 101, the main member 111 and the submember 112 are welded at point 17 by a spot welding machine 102. Further, the main member 111 and the submember 112 are welded at a point 18 by a laser welding machine 103. Therefore, the submember 112 is fixed to the main member 111 and forms the enclosed space 112a between the main member 111 and the submember 112. The frame member 11 of the door frame 1 is now formed.

The pillar member 12 of the door frame 1 is formed in the same manner (not shown) as the frame member 11.

After the frame member 11 and the pillar member 12 are formed, the frame member 11 and the pillar member 12 are welded together. The door frame 1 is thus formed.

The preferred embodiment described herein is intended to be illustrative and not restrictive, the scope of the invention being indicated in the appended claims. All variations which come within the meaning of the claims are intended be embraced therein.

What is claimed is:

1. A method for forming a door frame including a first supporting portion, a second supporting portion, a decorative portion and an enclosed space comprising:

bending a first sheet to form a main member including the first supporting portion, the second supporting portion and the decorative portion, while forming a side edge of the decorative portion, the width of which gradually changes, said main member having a first end edge;

bending a second sheet to form a submember having a first end and a second end, the second end having a second end edge;

inserting the first end of the submember between the first and second supporting portions of the main member; and attaching the main member and the submember free of any joint in the decorative portion, including:
welding the first end of the submember to the first and second supporting portions, and welding the second end of the submember at its second end edge to the first end edge of the main member, thereby forming the enclosed space which gradually changes in cross-sectional area.

2. A method for forming a door frame according to claim 1, wherein the welding step includes welding the main member and the submember at a plurality of points.

3. A method for forming a door frame according to claim 2, wherein the welding step at one of the plurality of points includes abutting an end face of the main member with an end face of the submember and welding the two-end faces together.

4. A method for forming a door frame including a first supporting portion, a second supporting portion, a decorative portion and an enclosed space comprising:

bending a first sheet to form a main member including the first supporting portion, the second supporting portion and the decorative portion, said main member having a first end face;

bending a second sheet to form a submember having a first end and a second end, the second end having a second end face;

inserting the first end of the submember between the first and second supporting portion of the main member;

attaching the main member and the submember free of any joint in the decorative portion, including abutting the first end face of the main member with the second end face of the submember and welding the two end faces together; and welding the first end of the submember to the first and second supporting portions, thereby forming the enclosed space.

5. A method of forming a door frame, comprising the steps of:

bending a first sheet into a main member having
 i) a first supporting portion including a first planar face and an end face extending transverse thereto,
 ii) a decorative portion contiguous with said first supporting portion and having a segment extending away from said first planar face, and
 iii) a second supporting portion contiguous with said decorative portion and including a second planar face opposing said first planar face and substantially parallel therewith, wherein said first and second planar faces define a space therebetween;

bending a second sheet into a submember having a third planar face and a curved portion extending therefrom with an end face extending transverse to said third planar face;

inserting said third planar face into said space between said first and second planar faces, such that said end face of said submember opposes said end face of said first supporting portion to form an enclosed space;

attaching the third planar face to the first and second planar faces; and attaching the opposed end faces to one another.

* * * * *